(12) United States Patent
Ma et al.

(10) Patent No.: US 12,119,635 B2
(45) Date of Patent: Oct. 15, 2024

(54) SUBSTATION FRAME

(71) Applicant: JIANGSU SHEMAR ELECTRIC CO., LTD., Nantong (CN)

(72) Inventors: Bin Ma, Nantong (CN); Aoyun Zhuang, Nantong (CN)

(73) Assignee: Jiangsu Shemar Electric Co., Ltd., Nantong (CN)

( * ) Notice: Subject to any disclaimer, the term of this patent is extended or adjusted under 35 U.S.C. 154(b) by 428 days.

(21) Appl. No.: 17/612,278

(22) PCT Filed: Jul. 22, 2021

(86) PCT No.: PCT/CN2021/107919
§ 371 (c)(1),
(2) Date: Nov. 18, 2021

(87) PCT Pub. No.: WO2022/022385
PCT Pub. Date: Feb. 3, 2022

(65) Prior Publication Data
US 2023/0081859 A1      Mar. 16, 2023

(30) Foreign Application Priority Data

Jul. 31, 2020 (CN) .......................... 202010761554.9
Jul. 31, 2020 (CN) .......................... 202010763324.6
Jul. 31, 2020 (CN) .......................... 202010763332.0

(51) Int. Cl.
*H02G 7/20* (2006.01)
*E04H 12/08* (2006.01)
(Continued)

(52) U.S. Cl.
CPC .............. *H02G 7/20* (2013.01); *E04H 12/08* (2013.01); *H01B 17/10* (2013.01); *H02B 5/00* (2013.01); *H02G 7/05* (2013.01)

(58) Field of Classification Search
None
See application file for complete search history.

(56) References Cited

U.S. PATENT DOCUMENTS

| 842,222 | A | * | 1/1907 | Mead | ...................... B60M 1/23 |
| | | | | | 174/45 R |
| 1,783,272 | A | * | 12/1930 | Austin | ..................... H02G 7/20 |
| | | | | | 174/45 R |

(Continued)

FOREIGN PATENT DOCUMENTS

| CN | 104481178 A | 1/2015 |
| CN | 105239817 A | 1/2016 |

(Continued)

OTHER PUBLICATIONS

European Search Report for corresponding Application No. 21793838.0 dated Jul. 25, 2022, 12 pages.

(Continued)

*Primary Examiner* — Krystal Robinson
(74) *Attorney, Agent, or Firm* — Taft Stettinius & Hollister LLP (57) ABSTRACT

The present disclosure specifically discloses a substation frame, comprising: at least two supporting assemblies arranged at intervals along a first direction, at least one of the supporting assemblies comprising a first supporting part and a second supporting part that are connected to each other; and a beam assembly provided between two adjacent supporting assemblies. The first supporting part is located between the beam assembly and the second supporting part. The first supporting part is made of composite insulating material, and the second supporting part is made of metal material.

15 Claims, 7 Drawing Sheets

(51) Int. Cl.
  *H01B 17/10*  (2006.01)
  *H02B 5/00*  (2006.01)
  *H02G 7/05*  (2006.01)

(56) References Cited

U.S. PATENT DOCUMENTS

| | | | | |
|---|---|---|---|---|
| 2,036,225 | A | * | 4/1936 | Lusignan, Jr. ............ H02G 7/20 |
| | | | | 174/2 |
| 2,606,952 | A | * | 8/1952 | Cofer ...................... E04H 12/24 |
| | | | | 52/156 |
| 6,031,187 | A | | 2/2000 | Giampieretti et al. |
| 7,057,103 | B1 | * | 6/2006 | Peabody .................. H02G 7/14 |
| | | | | 174/45 R |

FOREIGN PATENT DOCUMENTS

| | | | |
|---|---|---|---|
| CN | 205646718 | U | 10/2016 |
| CN | 110159051 | A | 8/2019 |
| CN | 110159052 | A | 8/2019 |
| CN | 210074720 | U | 2/2020 |
| CN | 111864543 | A | 10/2020 |
| CN | 111864545 | A | 10/2020 |
| CN | 111864546 | A | 10/2020 |
| EP | 0853362 | A1 | 7/1998 |
| JP | 2014193068 | A | 10/2014 |
| KR | 100917420 | B1 | 9/2009 |

OTHER PUBLICATIONS

International Search Report for Application No. PCT/CN2021/107919 dated Oct. 19, 2021, 6 pages.

* cited by examiner

SUBSTATION FRAME

CROSS REFERENCE TO RELATED APPLICATIONS

This is a U.S. National Stage application of, and claims priority to, PCT/CN2021/107919, filed Jul. 22, 2021, which further claims priority to Chinese Patent Application Nos. 202010761554.9, filed Jul. 31, 2020, 202010763324.6, filed Jul. 31, 2020, and 202010763332.0, filed Jul. 31, 2020, the disclosures of which are each incorporated herein by reference in its entirety.

TECHNICAL FIELD

The present disclosure relates to the technical field of substation equipment, and more particularly to a substation frame.

BACKGROUND

As one of the main equipment in a substation, a substation frame is used to suspend and support wires to connect switchgear or other electrical equipment.

Most of current substation frames are a combination of a conventional iron structure and a tension insulator string, a suspension insulator string, and a jumper wire, which have defects such as heavy weight, easy to rust or crack. For substations or converter stations, there are also problems such as large occupation of the conventional substation frame and difficulty in transportation and installation. Therefore, a mature substation frame design is urgently needed to solve the above problems.

SUMMARY

The present disclosure provides a substation frame, which can solve the problems of large occupation of the conventional substation frame and difficulty in transportation, installation and maintenance.

In order to solve the above technical problems, a technical solution adopted in the present disclosure is to provide a substation frame, comprising: at least two supporting assemblies arranged at intervals along a first direction, at least one of the supporting assemblies comprising a first supporting part and a second supporting part that are connected to each other; and a beam assembly provided between two adjacent supporting assemblies. The first supporting part is located between the beam assembly and the second supporting part. The first supporting part is made of composite insulating material, and the second supporting part is made of metal material.

According to an embodiment of the present disclosure, all the supporting assemblies comprise the first supporting part and the second supporting part.

According to an embodiment of the present disclosure, the beam assembly is made of composite insulating material.

According to an embodiment of the present disclosure, a flange assembly is provided between the supporting assembly and the beam assembly. An end of the supporting assembly and an end of the beam assembly are respectively connected to the flange assembly. The substation frame comprises a first attachment plate provided at a connection position between the beam assembly and the flange assembly. The first attachment plate is provided with a wire attaching hole for attaching a conducting wire.

According to an embodiment of the present disclosure, the substation frame further comprises a shielding case disposed outside the flange assembly.

According to an embodiment of the present disclosure, the beam assembly comprises at least two beam segments. Two adjacent beam segments are connected by flanges. The substation frame comprises a second attachment plate disposed at the flanges between two adjacent beam segments. The second attachment plate is provided with a wire attaching hole for attaching a conducting wire.

According to an embodiment of the present disclosure, the substation frame further comprises a plurality of hoops arranged at intervals on the beam assembly and a third attachment plate disposed on an outer wall of the hoop. The third attachment plate is provided with a wire attaching hole for attaching a wire.

According to an embodiment of the present disclosure, an inner wall of the hoop is provided with a plurality of first slots arranged at intervals and a plurality of second slots arranged at intervals. The first slots are disposed around an outer wall of the beam assembly, and the second slots and the first slots are alternatively arranged.

According to an embodiment of the present disclosure, the wire attaching hole is configured for connecting with an attachment fitting, and at least one wire attaching hole is a waist-shaped hole or an arc-shaped hole for allowing a direction of a force exerted by the attachment fitting on the beam assembly to keep intersecting a center line of the beam assembly after the attachment fitting is rotated.

According to an embodiment of the present disclosure, the substation frame further comprises wiring posts disposed corresponding to the supporting assemblies. The wiring post is made of composite insulating material. The wiring post comprises a first end disposed on the supporting assembly and a second end disposed opposite to the first end. The second end has a height higher than a height of the beam assembly. The second ends of all the wiring posts are electrically connected to each other. The second end is configured for attaching a ground wire. A down lead connects the ground wire and a ground point along at least one of the wiring posts.

According to an embodiment of the present disclosure, the beam assembly is gradually raised upward in a direction away from the supporting assembly on both sides to form an arched beam assembly.

According to an embodiment of the present disclosure, the beam assembly comprises an intermediate segment and edge segments disposed at both ends of the intermediate segment. The edge segments are made of composite insulating material, and the intermediate segment is made of metal material.

According to an embodiment of the present disclosure, three or a multiple of three wire attaching points for attaching wires are disposed between two adjacent supporting assemblies.

According to an embodiment of the present disclosure, the substation frame comprises an auxiliary support disposed between two adjacent support assemblies and supporting the beam assemblies. The auxiliary support comprises a first support and a second support that are connected to each other. The first support is arranged between the beam assembly and the second support. The first support is made of composite insulating material.

An advantageous effect of the present disclosure is that, unlike the prior art, the first supporting part of the support assembly connected to the beam assembly is made of composite insulating material. Since the first supporting part connected to the beam assembly is made of composite insulating material, the first supporting part has excellent electrical insulation performance, thereby reducing the electrical safe distance between the wires and the supporting assembly, and in turn effectively reducing the width of the substation frame and the cost of land acquisition. Further, the second supporting part is made of metal material, thereby achieving an effect of reducing the cost. In addition, the supporting assembly of the above-described composite structure is light in weight, not susceptible to rusting and cracking, and accordingly, which solves the problem of difficulty in transportation, installation and maintenance, and reduces the cost of transportation and installation.

BRIEF DESCRIPTION OF THE DRAWINGS

In order to illustrate the technical solutions in the present disclosure more clearly, the following will introduce briefly the drawings used in the description of the embodiments. Obviously, the drawings in the following description are merely several embodiments of the present disclosure. For those skilled in the art, other drawings can be obtained based on these drawings without creative work, in which.

DETAILED DESCRIPTION OF THE EMBODIMENTS

The technical solutions in the embodiments of the present disclosure will be described clearly and completely hereinafter with reference to the accompanying drawings. Apparently, the described embodiments are merely a part of but not all embodiments of the present disclosure. All other embodiments obtained by a person of ordinary skill in the art based on the embodiments of the present disclosure without creative effort are within the scope of the present disclosure.

Figure 1:
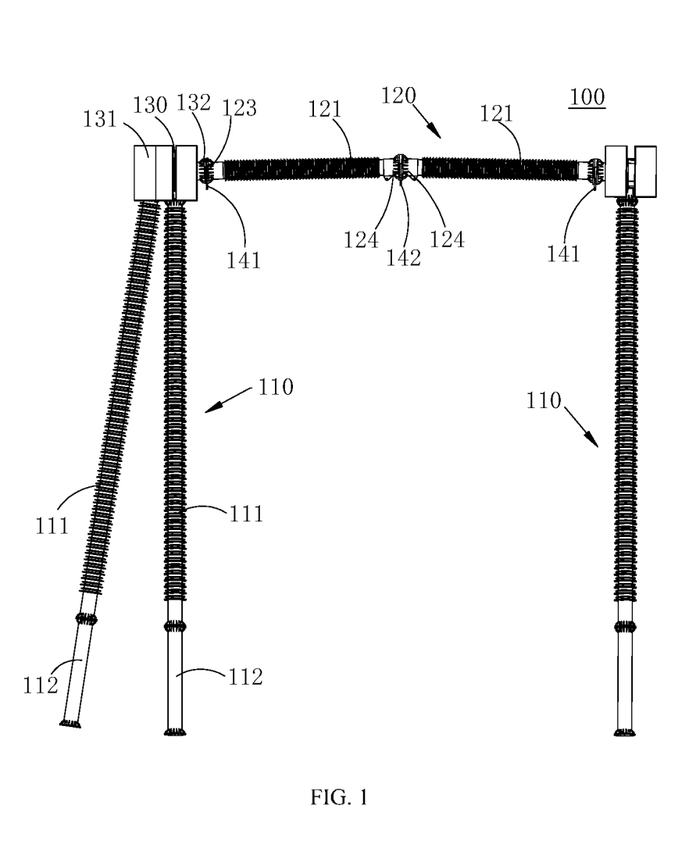
FIG. 1 is a schematic view showing an overall structure of a substation frame according to an embodiment of the present disclosure.
Figure 2:
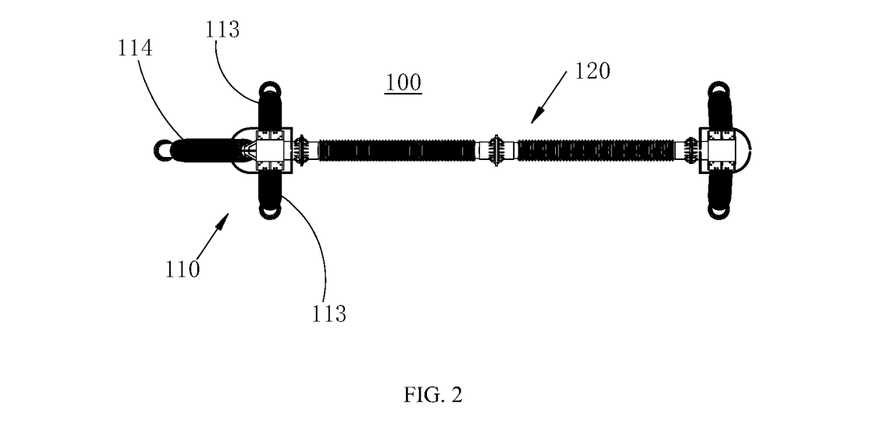
FIG. 2 is a schematic top view of a substation frame according to an embodiment of the present disclosure.

An embodiment of the present disclosure provides a substation frame 100. As shown in FIGS. 1 and 2, the substation frame 100 includes a supporting assembly 110 and a beam assembly 120. At least two supporting assemblies 110 are arranged at intervals along a first direction. The beam assembly 120 is provided between two adjacent supporting assemblies 110, and the supporting assembly 110 supports the beam assembly 120. The beam assembly 120 is used for attaching conducting wires. At least one supporting assembly 110 includes a first supporting part 111 and a second supporting part 112 connected to each other. The first supporting part 111 is located between the beam assembly 120 and the second supporting part 112. The first supporting part 111 is made of composite insulating material, and the second supporting part 112 is made of metal material. Since the first supporting part 111 connected to the beam assembly 120 is made of composite insulating material, the first supporting part 111 has excellent electrical insulation performance, thereby reducing an electrical safe distance between conducting wires and the supporting assembly 110, and in turn effectively reducing a width of the substation frame 100 and a cost of land acquisition. Further, the second supporting part 112 is made of metal material, thereby achieving an effect of reducing the cost. In addition, the supporting assembly 110 of the above-described composite structure is light in weight, not susceptible to rusting and cracking, and accordingly, which solves the problem of difficulty in transportation, installation and maintenance, and reduces the cost of transportation, installation and maintenance.

In order to further reduce the width of the substation frame 100, as shown in FIG. 1, all the support assemblies 110 include the first supporting part 111 and the second supporting part 112. The first supporting part 111 is made of composite insulating material, so as to fully develop its electrical insulation performance, thereby minimizing the electrical safe distance between the conducting wires and the supporting assembly 110, thereby reducing the width of the substation frame and the cost of land acquisition.

Since in the conventional substation frame, the beam assembly is made of metal material, and a combination of a tension insulator string, a suspension insulator string, or a jumper wire is required to attach the conducting wires, the overall height of the substation frame is high. In an embodiment, as shown in FIGS. 1, the beam assembly 120 is made of composite insulating material, and thus has excellent electrical insulating performance and can be used to attach the conducting wires directly without using a structure such as a suspension insulator. Since the conducting wire has a constant height relative to the ground, after eliminating the use of the suspension insulator to attach the wires, a height of the entire substation frame 100 can be reduced, and an amount of material used for the suspension insulator and the supporting assembly 110 can be reduced. Further, since the tension insulator string, the suspension insulator string, and the jumper wire are saved, it is possible to eliminate a problem of windage yaw discharge in the substation frame 100. The substation frame 100 made of the composite insulating material has advantages of light in weight, not susceptible to rusting and cracking, high efficiency in transportation and installation, no maintenance in the whole life cycle, and reduced operation and maintenance cost compared to the original ceramic insulator string. In an embodiment, as shown in FIG. 1, two supporting assemblies 110 are arranged at intervals along the first direction. In this case, the substation frame 100 is a single-span substation frame 100.

Figure 9:
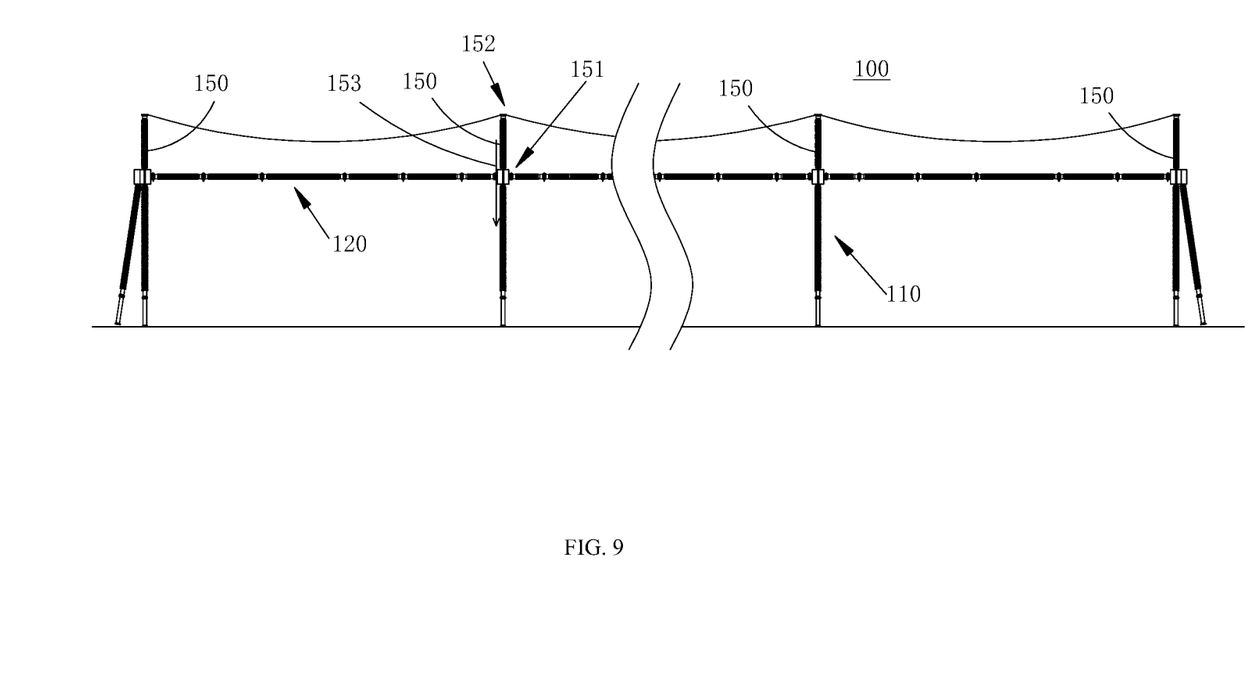
FIG. 9 is a schematic view showing an overall structure of a combined substation frame of a substation frame according to yet another embodiment of the present disclosure.

In yet another embodiment, as shown in FIG. 9, at least three, for example three, four or more, supporting assemblies 110 are arranged at intervals along the first direction. In this case, the substation frame 100 is a combined substation frame 100.

It should be noted that the beam assembly 120 and the first supporting part 111 may employ a post insulator structure including an insulating body located therein and a rubber shed covering an outside of the insulating body. Specifically, the insulating body may be an insulating tube or an insulating core rod. The insulating tube may be a glass steel tube formed by winding and curing glass fiber or aramid fiber impregnated with epoxy resin or a hollow pultruded tube by pultrusion. The insulating core rod may be a solid core rod formed by winding and curing glass fiber or aramid fiber impregnated with epoxy resin or a pultruded core rod formed by pultrusion. The rubber shed may be made of high-temperature vulcanized silicone rubber, or may be made of other forms of rubber material. The insulating body is provided with flanges at both ends. The flanges at both ends of the beam assembly 120 are fixedly connected to two flange assemblies 130 (as described below) at both ends of the substation frame 100, respectively. The flanges at both ends of the first supporting part 111 are respectively fixedly connected to the flange assembly 130 and the second supporting part 112, which may be connected by other connecting members, or may be fixed by welding, or may be connected in a combination thereof. In other embodiments, the beam assembly and the first supporting part may also be made of other composite insulating materials, which are not limited herein.

Figure 3:
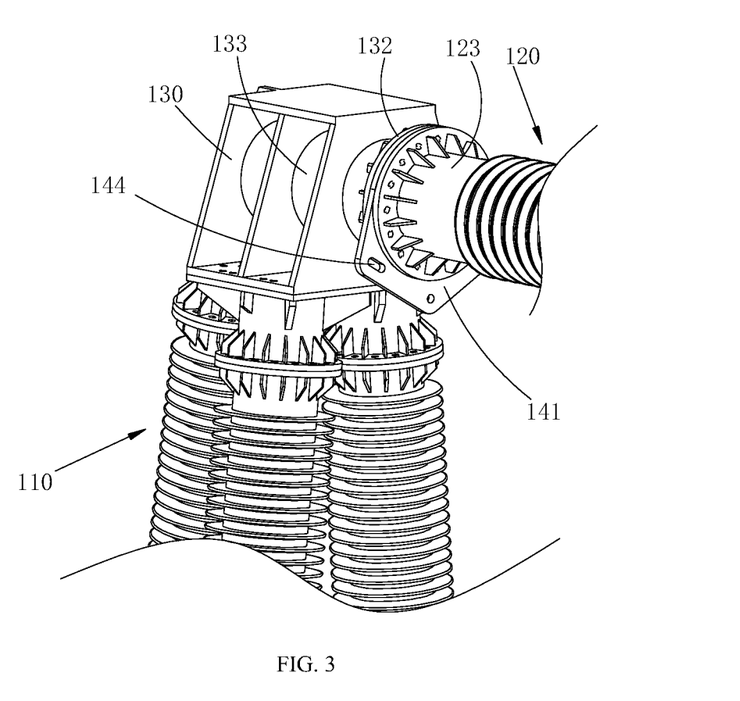
FIG. 3 is a schematic view showing a partial structure of a substation frame according to an embodiment of the present disclosure, which is mainly used to show a first attachment plate.

In an embodiment, as shown in FIG. 1, the beam assembly 120 is gradually raised upward in a direction away from the supporting assemblies 110 on both sides to form an arched beam assembly 120, so that the substation frame 100 can counteract vertical sag with its own arched structure, thus reducing safety hazards. As shown in FIGS. 1 and 3, a flange assembly 130 is provided between the supporting assembly 110 and the beam assembly 120. An end of the supporting assembly 110 and an end of the beam assembly 120 are respectively connected to the flange assembly 130. The flange assembly 130 includes a cylindrical body 133 having an axis inclined upwardly and forming an acute angle with the horizontal plane, thereby ensuring that the cylindrical body 133 can have a tendency to pre-arch upward after being mounted. When the flange assembly 130 is connected to the beam assembly 120, a linkage pre-arch angle can be generated so that the beam assembly 120 can be gradually raised upward in the direction away from the supporting assemblies 110 on both sides to form the arched beam assembly 120.

As shown in FIGS. 1 and 3, the substation frame 100 further includes a first attachment plate 141 disposed at a connection position between the beam assembly 120 and the flange assembly 130. The first attachment plate 141 is provided with a plurality of wire attaching holes 144 for attaching conducting wires. That is, a wire attaching point is formed at the first attachment plate 141.

Specifically, as shown in FIGS. 1 and 3, an end of the flange assembly 130 is provided with a first flange 132. An end of the beam assembly 120 is provided with a second flange 123. The first flange 132 and the second flange 123 are connected by a first fastener (not shown in the figures), and the first attachment plate 141 is sandwiched between the first flange 132 and the second flange 123. The first attachment plate 141 is provided with two wire attaching holes 144 and one reserved hole (not shown in the figures). The reserved hole is located directly below the beam assembly 120, and the two wire attaching holes 144 are symmetrically arranged on both sides of the reserved hole.

Figure 4:
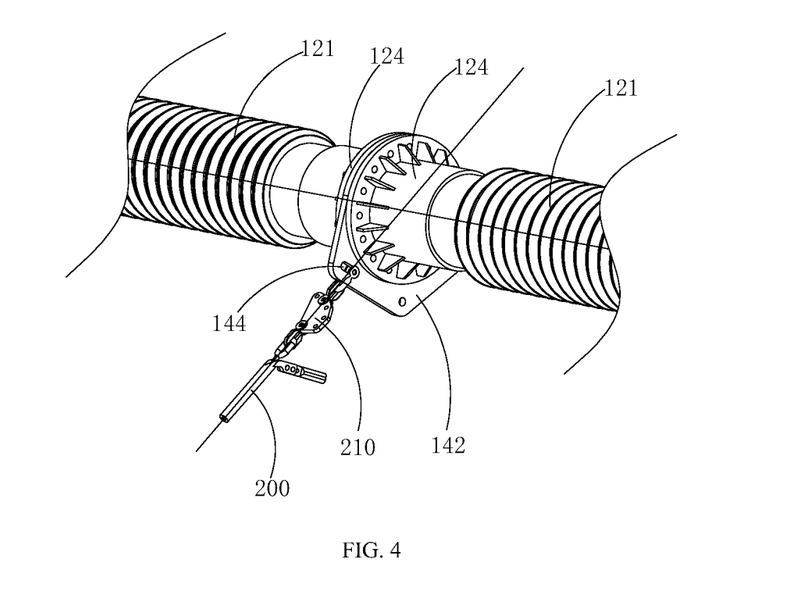
FIG. 4 is a schematic view showing a partial structure of a substation frame according to an embodiment of the present disclosure, which is mainly used to show a second attachment plate.

In an embodiment, as shown in FIGS. 1 and 4, the beam assembly 120 includes at least two beam segments 121, such as two, three, or more beam segments 121. Two adjacent beam segments 121 are connected by flanges. The substation frame 100 includes a second attachment plate 142 disposed at the flanges between two adjacent beam segments 121. The second attachment plate 142 is provided with a plurality of wire attaching holes 144 for attaching conducting wires. That is, a wire attaching point is formed at the second attachment plate 142.

Specifically, as shown in FIGS. 1 and 4, the beam assembly 120 includes two beam segments 121. Adjacent ends of the two beam segments 121 are respectively connected to a third flange 124. A second attachment plate 142 is sandwiched between two third flanges 124. The second attachment plate 142 is provided with two wire attaching holes 144 and one reserved hole. The reserved hole is located directly below the beam assembly 120, and the two wire attaching holes 144 are symmetrically arranged on both sides of the preformed hole. In FIG. 1, the substation frame 100 is a single-span substation frame 100. The single-span substation frame 100 is provided with two supporting assemblies 110 arranged at intervals along the first direction. Both ends of the beam assembly 120 are respectively connected to top ends of the two supporting assemblies 110 by the flange assembly 130. The single-span substation frame 100 is provided with two first attachment plates 141 at both ends, and one second attachment plate 142 is provided in the middle of the beam assembly 120, thus forming three wire attaching points, which are used for attaching three-phase wires A, B and C, respectively.

Figure 5:
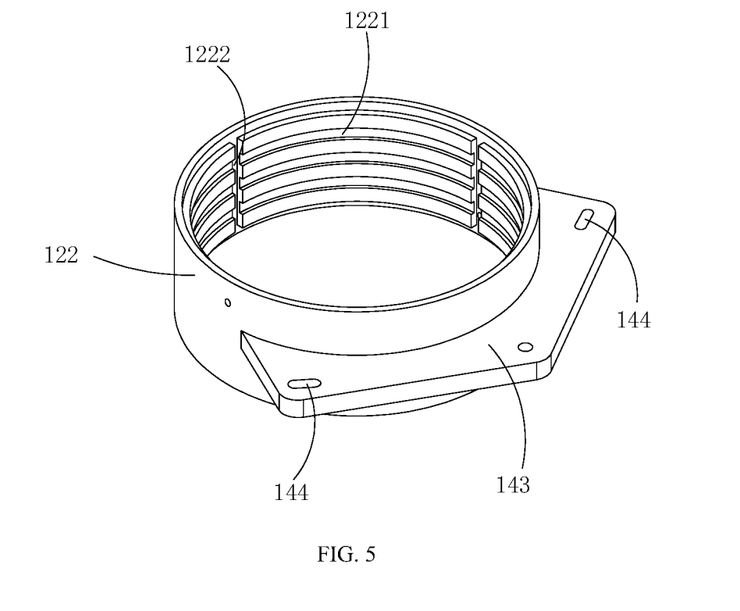
FIG. 5 is a schematic view showing structures of a hoop and a third attachment plate of a substation frame according to still another embodiment of the present disclosure.

In yet another embodiment, the beam assembly 120 may not be provided in segments, i.e., the entire beam assembly 120 is a strip-shaped composite post insulator. The strip-shaped composite post insulator includes an insulating body located therein and a rubber shed covering an outside of the insulating body. The insulating body and the rubber shed are identical to those described above and not repeated herein. As shown in FIG. 5, the substation frame 100 includes a plurality of hoops 122 and a third attachment plate 143. The hoops 122 are sleeved on the beam assembly 120 at intervals. The third attachment plate 143 is arranged on the outer wall of the hoop 122. The third attachment plate 143 is provided with a plurality of wire attaching holes 144 for attaching conducting wires. That is, wire attaching points are formed at the third attachment plate 143. The hoop 122 can be glued and fixed to the beam assembly 120. Specifically, the hoop 122 is first glued and fixed to the insulating body, then the rubber shed is coated as a whole, and the rubber shed is coated on both ends of the hoop 122, so that the hoop 122 is in a sealed connection with the rubber shed. An inner wall of the hoop 122 is provided with a plurality of first slots 1221 arranged at intervals and a plurality of second slots 1222 arranged at intervals. The plurality of first slots 1221 are disposed around the outer wall of the beam assembly 120, and the plurality of second slots 1222 and the first slots 1221 are alternatively arranged, so that the first slots 1221 and the second slots 1222 can cooperate to limit an axial sliding and a radial rotation of the hoop 122 on the beam assembly 120, so as to maintain the stability of the connection between the hoop 122 and the beam assembly 120. Further, the first slots 1221 and the second slots 1222 are alternatively arranged, such that when the glue material is filled, the glue material can flow sufficiently and uniformly in the first slots 1221 and the second slots 1222, which facilitates glue connection between the hoop 122 and the insulating body, and improves the bonding strength.

Specifically, as shown in FIG. 5, the third attachment plate 143 is integrally formed with the hoop 122. The first slots 1221 and the second slots 1222 on the inner wall of the hoop 122 are vertically arranged. The third attachment plate 143 is provided with two wire attaching holes 144 and one reserved hole. The reserved hole is located directly below the beam assembly 120, and the two wire attaching holes 144 are symmetrically arranged on both sides of the reserved hole.

Of course, in other embodiments, a plurality of beam segments 121 can be spliced and combined with the hoop 122. For example, the beam assembly 120 includes a long beam segment 121 and a short beam segment 121. The long beam segment 121 and the short beam segment 121 are connected by the flanges. The second attachment plate 142 is provided at the flanges. The hoop 122 is sleeved on the long beam segment 121. The specific implementation is selected according to the actual situation, and which is not limited herein.

Figure 7:
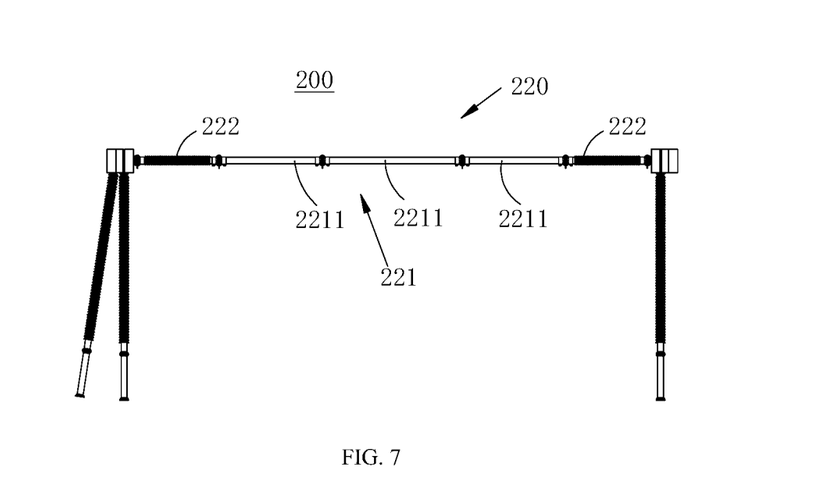
FIG. 7 is a schematic view showing an overall structure of a substation frame according to another embodiment of the present disclosure.
Figure 8:
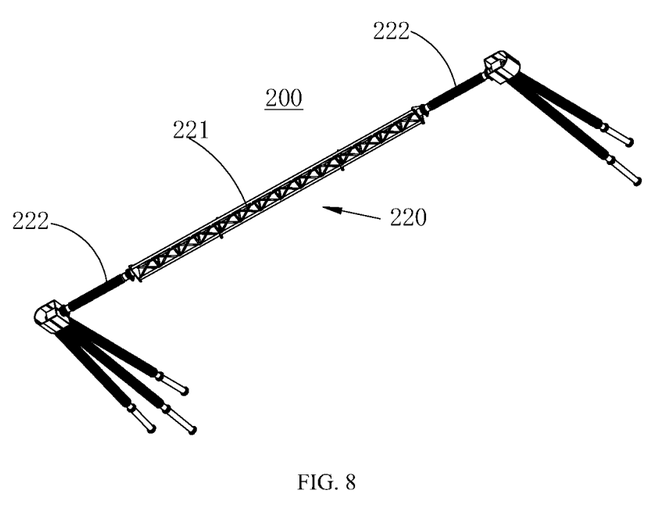
FIG. 8 is a schematic view showing an overall structure of a substation frame according to yet another embodiment of the present disclosure.

In another embodiment, as shown in FIGS. 7 and 8, the beam assembly 220 of the substation frame 200 includes an intermediate segment 221 and edge segments 222 disposed at both ends of the intermediate segment 221. The edge segments 222 are made of composite insulating material, and the intermediate segment 221 is made of metal material. The edge segment 222 is made of composite insulating material, and thus has excellent electrical insulating performance and can be used to directly attach the conducting wires, thereby reducing the structures such as the suspension insulators and the like to a certain extent. Further, since the tension insulator string, the suspension insulator string, and the jumper wire are saved, it is possible to eliminate a problem of windage yaw discharge in the edge wires. The edge segment 222 made of composite insulating material has advantages of light in weight, not susceptible to rusting and cracking, high efficiency in transportation and installation, no maintenance in the whole life cycle, and reduced operation and maintenance cost compared to the original ceramic insulator string. Further, the intermediate segment 221 is made of metal material, so that the material cost can be reduced.

The structure and material of the edge segment 222 are similar to those of the beam assembly 120 made of composite insulating material described above and which are not repeated herein. With the beam assembly 220 of this structure, on the one hand, the edge segment 222 made of composite insulating material has advantages of light in weight, not susceptible to rusting and cracking, high efficiency in transportation and installation, no maintenance in the whole life cycle, and reduced operation and maintenance cost compared to the original ceramic insulator string. On the other hand, the intermediate segment 221 is made of metal material, so that the material cost can be reduced.

It should be noted that since the intermediate segment 221 is made of metal material, the intermediate segment 221 still needs to attach the conducting wire via the suspension insulator.

In one embodiment, as shown in FIG. 7, the intermediate segment 221 may include at least two metal tubes 2211. Two adjacent metal tubes 2211 are connected by flanges. Specifically, the intermediate segment 221 may include two, three, or more metal tubes 2211. Further, in other embodiments, the intermediate segment 221 may also include only one metal tube.

In another embodiment, as shown in FIG. 8, the intermediate segment 221 may also be a metal lattice post. Of course, in other embodiments, the intermediate segment 221 may also be other structures made of other metal materials, and which is not limited herein.

Similarly, as shown in FIG. 7, the edge segment 222 may be a beam segment, or as shown in FIG. 4, the edge segment 222 may be formed by splicing at least two beam segments 121. The two beam segments 121 are respectively provided with one third flange 124 at their adjacent ends. The two third flanges 124 are connected by fasteners. One second attachment plate 142 can further be sandwiched between the two third flanges 124. The second attachment plate 142 is provided with two wire attaching holes 144 and one preformed hole. The preformed hole is located directly below the beam assembly 120, and the two wire attaching holes 144 are symmetrically arranged on both sides of the preformed hole for attaching the conducting wires. That is, the wire attaching point is formed at the second attachment plate 142.

Alternatively, when the edge segment 222 is long, the wire attaching point may be disposed on the edge segment 222. In this case, the edge segment 222 may be a strip-shaped composite post insulator. The strip-shaped composite post insulator is identical to that as described above, and which will not be repeated herein. As shown in FIG. 5, the edge segment 222 also includes the plurality of hoops 122 and the third attachment plate 143. The plurality of hoops 122 are sleeved on the edge segment 222 at intervals. The third attachment plate 143 is arranged on the outer wall of the hoops 122. The third attachment plate 143 is provided with the plurality of wire attaching hole 144 for attaching conducting wires. That is, the wire attaching point is formed at the third attachment plate 143. The hoop 122 can be glued and fixed to the edge segment 222. The specific gluing structure and gluing method are the same as those described above, and details thereof are not repeated herein. Of course, in other implementations, the edge segment 222 may also be formed by splicing the plurality of beam segments 121 and combining them with the hoop 122.

Further referring to FIG. 4, the wire attaching holes 144 of each of the attachment plates are connected to an attachment fitting 210. The conducting wire is connected to the attachment fitting 210 so that the wire attaching holes 144 can attach the conducting wire. The wire attaching hole 144 in the attachment plate for attaching the attachment fitting 210 is generally circular-shaped, but considering that the attachment fitting 210 may rotate by an angle under an action of an external force, thus, after the attachment fitting 210 is rotated, a direction of a force between the attachment fitting 210 and each attachment plate does not intersect a center line of each attachment plate. That is, a torque force is generated on each attachment plate, and this force causes the connection to become loose and even reduces the supporting life. In order to keep the direction of the force between the attachment fitting 210 and each attachment plate intersecting the center line of each attachment plate after the attachment fitting 210 is rotated, in the present disclosure, at least one wire attaching hole 144 in each attachment plate is provided as a waist-shaped hole or an arc-shaped hole. The attachment fitting 210 automatically moves in the wire attaching hole 144 after the attachment fitting 210 is rotated, so that the direction of the force exerted by the attachment fitting 210 on each attachment plate intersects the center line of each attachment plate, thereby maintaining the stability of the connection of each attachment plate, enhancing the stability of the substation frame 100, and prolonging the service life thereof. In order to ensure the mechanical stability of the substation frame 100, the center line of each attachment plate coincides with the center line of the beam assembly 120, so that the wire attaching hole 144 is provided as the waist-shaped hole or an arc-shaped hole to ensure that the direction of the force exerted by the attachment fitting 210 on the beam assembly 120 remains intersecting the center line of the beam assembly 120.

The flange assembly 130 disposed between the supporting assembly 110 and the beam assembly 120 is prone to abnormal discharge in the vicinity of a strong electric field due to a large number of irregular contours and a relatively short distance from the first attachment plate 141. As shown in FIG. 1, the substation frame 100 further includes a shielding case 131. The shielding case 131 is disposed outside the flange assembly 130 to prevent abnormal discharge.

Figure 6:
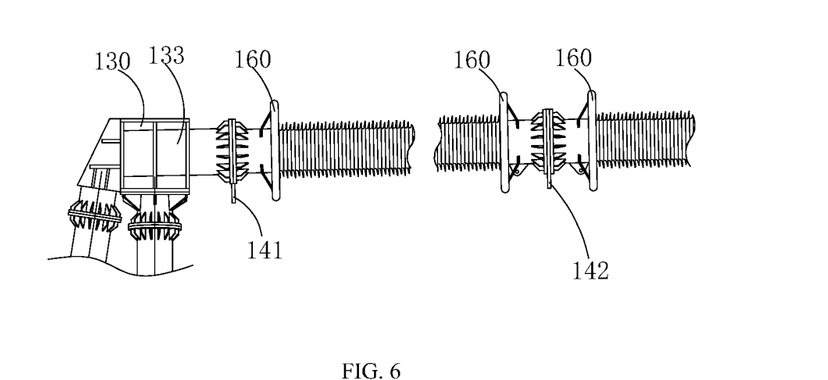
FIG. 6 is a schematic view showing a partial structure of a substation frame according to an embodiment of the present disclosure, which is mainly used to show a grading ring.

In addition, as shown in FIG. 6, a grading ring 160 is disposed on the beam assembly 120 on a side of the first attachment plate 141 away from the flange assembly 130. The grading ring 160 can evenly distribute the high voltage around to ensure that there is no potential difference between various parts of the ring, thereby achieving the effect of equalizing the voltage and preventing abnormal discharge from occurring.

Further, as shown in FIG. 6, the grading ring 160 is further provided on at least one side of the second attachment plate 142, so as to uniform the electric field and prevent discharge from occurring. Preferably, the grading rings 160 are disposed on both sides of the second attachment plate 142.

Similarly, the grading ring (not shown in the figures) is further disposed on at least one side of the third attachment plate 143, so as to uniform an electric field and prevent discharge from occurring. Preferably, the grading rings are disposed on both sides of the third attachment plate 143.

In an embodiment, as shown in FIGS. 1 and 2, each supporting assembly 110 includes two main supporting posts 113. Each main supporting post 113 includes the first supporting part 111 and the second supporting part 112. The first supporting part 111 is made of composite insulating material. The two main supporting posts 113 are respectively connected to the flange assembly 130. The plane in which the axes of the two main supporting posts 113 are located is perpendicular to the first direction, and an angle of 5°-70° is formed between the two main supporting posts 113.

Further, as shown in FIG. 2, in the two supporting assemblies 110 located on both sides, at least one of the supporting assemblies 110 further includes an oblique supporting post 114. The oblique supporting post 114 is connected to the flange assembly 130, and includes the first supporting part 111 and the second supporting part 112. The first supporting part 111 is made of composite insulating material. The oblique supporting post 114 is located outside the plane where the two main supporting posts 113 are located, so as to limit an offset of the substation frame 100 in the first direction. It should be noted that the oblique supporting post 114 is provided on a side away from the beam assembly 120.

The substation frame 100 needs to be grounded, especially in the case of the combined substation frame 100. When the beam assembly 120 is made of composite insulating material and can be directly used to attach the conducting wire, since the ground wire must maintain a sufficient electrical safety distance between the ground wire and the conducting wire, and a lightning protection problem must be taken into account, thus how to attach the ground wire is particularly important. As shown in FIG. 9, in an embodiment, the substation frame 100 further includes wiring posts 150 disposed opposite to the supporting assembly 110. The wiring post 150 is made of composite insulating material, and includes a first end 151 disposed on the supporting assembly 110 and a second end 152 disposed opposite to the first end 151. The second end 152 has a height higher than a height of the beam assembly 120. The second end 152 of the wiring post 150 is used for attaching the ground wire. The second ends 152 of the wiring posts 150 are electrically connected to each other. By providing the wiring posts 150, and since the second end 152 of the wiring post 150 has a height higher than the height of the beam assembly 120, the second end 152 of the wiring post 150 has a height higher than the height of the wire attaching on the beam assembly 120. As such, the electrical safe distance between the ground wire and the wire can be ensured, and the lightning protection function can be achieved. Since both the wiring post 150 and the first supporting part 111 are made of insulating material, the grounding wire needs to be connected to a down lead 153 to complete the grounding. Since a mounting process during which the down lead 153 is attached to the wiring post 150 is relatively complicated, after all the second ends 152 of the wiring posts 150 are electrically connected, only the down lead 153 needs to be connected to the grounding point along one of the wiring posts 150 to realize the whole grounding of the substation frame 100, and thus the mounting process is convenient. Of course, in other embodiments, the down lead 153 may also be connected to the ground point along several or all of the wiring posts 150, and which is not limited herein. In an embodiment, the electrical connection between the second ends 152 of the wiring posts 150 may be realized by connecting the conducting wires between the second ends 152 of the wiring posts 150.

In order to ensure a stable connection between the wiring post 150 and the beam assembly 120, the direction of the wiring post 150 is along the same straight line as the axis of the supporting assembly 110. That is, the wiring post 150 is vertically disposed on the beam assembly 120, and the axial direction of the wiring post 150 coincides with the direction of gravity thereof. The wiring post 150 may be stably disposed on the supporting assembly 110. Specifically, the wiring post 150 is disposed on the flange assembly 130 between the supporting assembly 110 and the beam assembly 120. The first end 151 of the wiring post 150 and a top end of the flange assembly 130 may be connected by the flange, may be fixed by welding, or may be connected in a combination of the above connection methods, which is not limited herein.

When the electrical safe distance between the first end 151 of the wiring post and the attaching point for attaching the wire on the beam assembly 120 is sufficient, the down lead 153 may be disposed to be attached to the wiring post 150.

In an embodiment, when the substation frame 100 is the combined substation frame 100, three or a multiple of three wire attaching points, such as three, six or nine, for attaching the wires are provided between two adjacent supporting assemblies 110 to adapt to the attaching of the three-phase wires. Three adjacent wire attaching points are respectively attached to the three-phase wires of A, B, and C, and a sufficient in-phase electrical safety distance between the three phases of A, B, and C needs to be ensured. It should be noted that, in order to ensure the electrical safe distance between adjacent wire attaching points, when the substation frame 100 is the combined substation frame 100, no wire attaching point is provided at the connection between the flange assembly 130 at the middle position and the beam assemblies 120 on both sides, or only one side is provided with a wire attaching point.

In addition, the distance between the nearest two wire attaching points on both sides of the supporting assembly 110 at the middle position is required to satisfy a phase-to-phase safety electrical distance of the wires attached to the substation frame 100.

It should be noted that, when the distance between the wire attached to the nearest wire attaching point of the supporting assembly 110 and the supporting assembly 110 does not satisfy the safe electrical distance between the down lead 153 and the wire, a supporting structure can be additionally provided to ensure the safe electrical distance between the down lead 153 and the wire attached to the attaching point. The distance between the down lead 153 and the wire can be greater than a first predetermined value.

Specifically, a connection portion of the wiring post 150 and the supporting assembly 110 is provided with a post insulator (not shown in the figures), which forms a supporting structure. The post insulator includes a proximal end disposed on the supporting assembly 110 and a distal end opposite to the proximal end. A distance between the distal end of the post insulator and the wire is greater than the first predetermined value. The down lead 153 is attached to the distal end of the post insulator from the second end 152 of the wiring post 150 and then led to ground, so as to ensure a safe electrical distance between the down lead 153 and the conducting wire attached to the wire attaching point.

Figure 10:
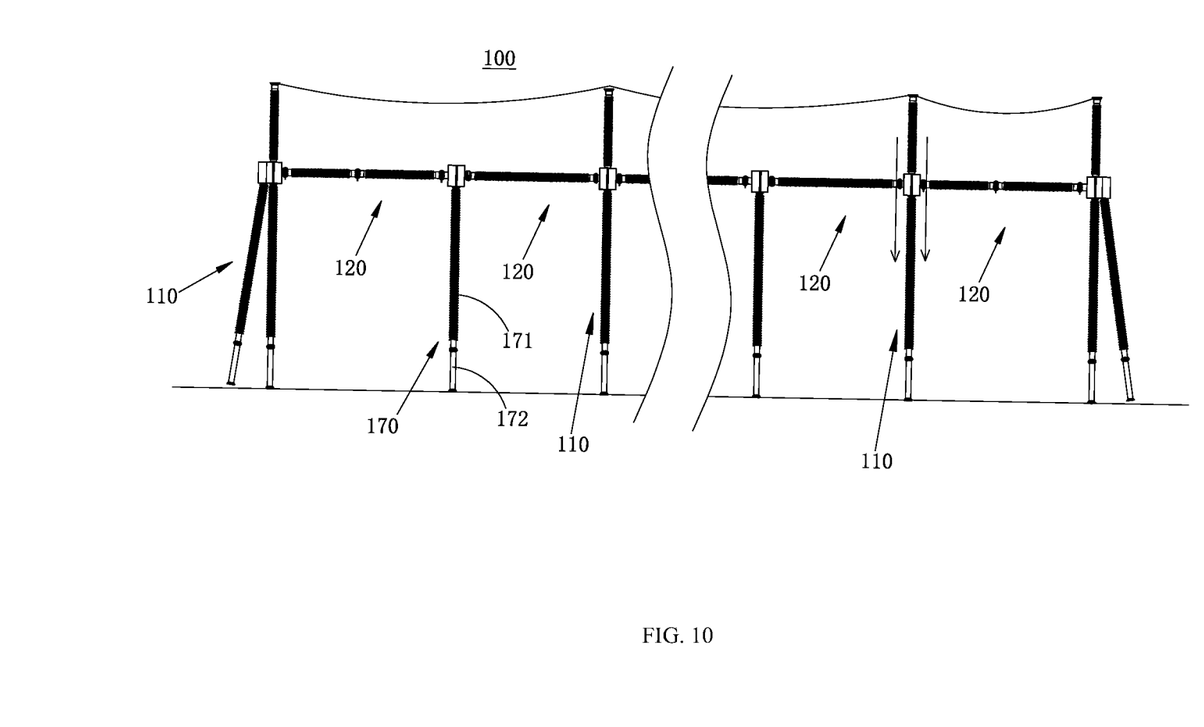
FIG. 10 is a schematic view showing an overall structure of a combined substation frame of a substation frame according to another embodiment of the present disclosure.

In yet another embodiment, the longer the diameter of the beam assembly 120 made of composite insulating material is, the higher the mechanical strength is. The axial length thereof can be set to be longer to provide more attaching points. Further, as the diameter increases, the manufacturing cost increases rapidly, and the material cost increases accordingly. As shown in FIG. 10, in order to reduce the cost of the beam assembly 120, the substation frame 100 further includes an auxiliary support 170. The auxiliary support 170 is disposed between two adjacent supporting assemblies 110 and used for supporting the beam assemblies 120, so that in a case where the distance between the two supporting assemblies 110 is fixed, the diameter of the beam assembly 120 provided with the auxiliary support 170 may be set below a first diameter, which is smaller than the diameter of the beam assembly 120 when no auxiliary support 170 is provided, thereby reducing the cost of the beam assembly 120. The overall cost of the substation frame 100 is reduced, reflecting the advantages of the composite insulating material.

In order to maintain the overall performance of the substation frame 100, as shown in FIG. 10, the auxiliary support 170 includes a first support 171 and a second support 172. The first support 171 is located between the beam assembly 120 and the second support 172. The first support 171 is made of composite insulating material, and the second support 172 is made of metal material.

It should be noted that the first support member 117 may adopt a post insulator structure similar to the beam assembly 120 and the first supporting part 111, or may be made of other composite insulating materials, and the details thereof are not repeated herein.

In one embodiment, as shown in FIG. 10, there are three wire attaching points for attaching the wires between the auxiliary support 170 and the supporting assembly 110 adjacent to a first side thereof, and there is no attached wire between the auxiliary support 170 and the supporting assembly 110 adjacent to a second side thereof. The second side is opposite to the first side.

In summary, by setting the first supporting part 111 of the support assembly 110 connected to the beam assembly 120 to be made of composite insulating material, the first supporting part 111 has excellent electrical insulation performance, thereby reducing the electrical safe distance between the conducting wires and the supporting assembly 110, and in turn effectively reducing the width of the substation frame 100 and the cost of land acquisition. Further, the second supporting part 112 is made of metal material, thereby achieving an effect of reducing the cost. In addition, the supporting assembly 110 of the above-described composite structure is light in weight, not susceptible to rusting and cracking, and accordingly, which solves the problem of difficulty in transportation, installation and maintenance, and reduces the cost of transportation and installation.

Further, the beam assembly 120 is made of composite insulating material, and thus has excellent mechanical performance and electrical insulating performance and can be used to directly attach the conducting wire without using a structure such as a suspension insulator. Since the wire has a constant height relative to the ground, after eliminating the use of the suspension insulator, a height of the entire substation frame 100 can be reduced, and an amount of material used for the suspension insulator and the supporting assembly 110 can be reduced. Further, since the tension insulator string, the suspension insulator string, and the jumper wire are eliminated, it is possible to eliminate the problem of windage yaw discharge in the substation frame 100. The substation frame 100 made of composite insulating material has advantages of light in weight, not susceptible to rusting and cracking, low cost and high efficiency in transportation and installation, no maintenance in the whole life cycle, and reduced operation and maintenance cost of the original ceramic insulator string.

The foregoing description is merely embodiments of the present disclosure, and is not intended to limit the patent scope of the present disclosure. Any equivalent structure or equivalent principle variants made by using the specification of the present disclosure and the contents of the accompanying drawings, or directly or indirectly applied to other related technical fields, is likewise included within the scope of the patent protection of the present disclosure.

What is claimed is:

1. A substation frame comprising:
   at least two supporting assemblies arranged at intervals along a first direction, each supporting assembly including a first supporting part and a second supporting part that are connected to each other;
   a beam assembly provided between two adjacent supporting assemblies;
   a flange assembly is provided between the supporting assembly and the beam assembly, wherein an end of the supporting assembly and an end of the beam assembly are respectively connected to the flange assembly; and
   a first attachment plate provided at a connection position between the beam assembly and the flange assembly, wherein the first attachment plate is provided with a first wire attaching hole for attaching a first conducting wire;
   wherein the first supporting part is located between the beam assembly and the second supporting part, the first supporting part is made of composite insulating material, and the second supporting part is made of metal material; and the beam assembly is made of composite insulating material.

2. The substation frame according to claim 1, further comprising:
a shielding case disposed outside the flange assembly.

3. The substation frame according to claim 2, wherein the first wire attaching hole is configured for connecting with an attachment fitting, and the first wire attaching hole is a waist-shaped hole or an arc-shaped hole for allowing a direction of a force exerted by the attachment fitting on the beam assembly to keep intersecting a center line of the beam assembly after the attachment fitting is rotated.

4. The substation frame according to claim 1, wherein the beam assembly includes at least two beam segments, two adjacent beam segments are connected by flanges, and the substation frame further comprises:
a second attachment plate disposed at the flanges between two adjacent beam segments, wherein the second attachment plate is provided with a second wire attaching hole for attaching a second conducting wire.

5. The substation frame according to claim 4, wherein the second wire attaching hole is configured for connecting with an attachment fitting, and the second wire attaching hole is a waist-shaped hole or an arc-shaped hole for allowing a direction of a force exerted by the attachment fitting on the beam assembly to keep intersecting a center line of the beam assembly after the attachment fitting is rotated.

6. The substation frame according to claim 1, wherein the beam assembly is gradually raised upward in a direction away from the supporting assembly on both sides to form an arched beam assembly.

7. A substation frame comprising:
at least two supporting assemblies arranged at intervals along a first direction, each supporting assembly including a first supporting part and a second supporting part that are connected to each other;
a beam assembly provided between two adjacent supporting assemblies;
hoops arranged at intervals on the beam assembly; and
a third attachment plate disposed on an outer wall of the hoop, wherein the third attachment plate is provided with a wire attaching hole for attaching a conducting wire;
wherein the first supporting part is located between the beam assembly and the second supporting part, the first supporting part is made of composite insulating material, and the second supporting part is made of metal material; and
the beam assembly is made of composite insulating material.

8. The substation frame according to claim 7, wherein an inner wall of at least one of the hoops is provided with a plurality of first slots arranged at intervals and a plurality of second slots arranged at intervals, the first slots are disposed around an outer wall of the beam assembly, and the second slots and the first slots are alternatively arranged.

9. The substation frame according to claim 8, wherein the wire attaching hole is configured for connecting with an attachment fitting, and the wire attaching hole is a waist-shaped hole or an arc-shaped hole for allowing a direction of a force exerted by the attachment fitting on the beam assembly to keep intersecting a center line of the beam assembly after the attachment fitting is rotated.

10. The substation frame according to claim 1, wherein the first wire attaching hole is configured for connecting with an attachment fitting, and the first wire attaching hole is a waist-shaped hole or an arc-shaped hole for allowing a direction of a force exerted by the attachment fitting on the beam assembly to keep intersecting a center line of the beam assembly after the attachment fitting is rotated.

11. The substation frame according to claim 1, further comprising:
wiring posts corresponding to the supporting assemblies, wherein each wiring post is made of composite insulating material, and each wiring post includes a first end disposed on the supporting assembly and a second end disposed opposite to the first end, the second end has a height higher than a height of the beam assembly, the second ends of all the wiring posts are electrically connected to each other, at least one of the second ends is configured for attaching a ground wire, and a down lead connects the ground wire and a ground point along at least one of the wiring posts.

12. The substation frame according to claim 7, wherein the wire attaching hole is configured for connecting with an attachment fitting, and the wire attaching hole is a waist-shaped hole or an arc-shaped hole for allowing a direction of a force exerted by the attachment fitting on the beam assembly to keep intersecting a center line of the beam assembly after the attachment fitting is rotated.

13. A substation frame comprising:
at least two supporting assemblies arranged at intervals along a first direction, at least one of the supporting assemblies including a first supporting part and a second supporting part that are connected to each other; and
a beam assembly provided between two adjacent supporting assemblies,
wherein the first supporting part is located between the beam assembly and the second supporting part, the first supporting part is made of composite insulating material, and the second supporting part is made of metal material; and
the beam assembly includes an intermediate segment and edge segments disposed at both ends of the intermediate segment, the edge segments are made of composite insulating material, and the intermediate segment is made of metal material.

14. The substation frame according to claim 1, wherein three or a multiple of three wire attaching points for attaching conducting wires are disposed between two adjacent supporting assemblies.

15. The substation frame according to claim 1, wherein the substation frame further comprises an auxiliary support disposed between two adjacent support assemblies and supporting the beam assemblies, the auxiliary support includes a first support and a second support that are connected to each other, the first support is located between the beam assembly and the second support, and the first support is made of composite insulating material.

* * * * *